(12) United States Patent
Sakamoto et al.

(10) Patent No.: US 7,364,525 B2
(45) Date of Patent: Apr. 29, 2008

(54) HYDRAULIC CONTROL APPARATUS OF AUTOMATIC TRANSMISSION

(75) Inventors: Osamu Sakamoto, Handa (JP); Kiyoharu Takagi, Okazaki (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 240 days.

(21) Appl. No.: 11/358,026

(22) Filed: Feb. 22, 2006

(65) Prior Publication Data

US 2006/0189429 A1    Aug. 24, 2006

(30) Foreign Application Priority Data

Feb. 24, 2005  (JP) .............................. 2005-049149

(51) Int. Cl.
*F16H 31/00* (2006.01)
(52) U.S. Cl. ..................................... 475/132
(58) Field of Classification Search ................ 475/132; 477/116, 117
See application file for complete search history.

(56) References Cited

U.S. PATENT DOCUMENTS

| | | | | |
|---|---|---|---|---|
| 5,367,922 A | * | 11/1994 | Jan | 74/732.1 |
| 5,797,821 A | * | 8/1998 | Fujimoto et al. | 475/120 |
| 5,895,334 A | * | 4/1999 | Yu | 475/128 |
| 6,183,393 B1 | * | 2/2001 | Habeck | 477/117 |

FOREIGN PATENT DOCUMENTS

JP         2004-116734         4/2004

* cited by examiner

*Primary Examiner*—Dirk Wright
(74) *Attorney, Agent, or Firm*—Buchanan Ingersoll & Rooney PC (57) ABSTRACT

A hydraulic control apparatus is improved in reliability during a garage shifting with reducing costs of the apparatus. An electronic control unit controls equalizing the shift pattern (on-off pattern) during a first garage shifting when a manual valve is shifted from the neutral position to a drive position to the shift pattern during a second garage shifting when the manual valve is shifted from the neutral position to the reverse position. A control valve unit controls the hydraulic pressure applied to a first engagement element during the first garage shifting while controlling the hydraulic pressure applied to a second engagement element during the second garage shifting.

15 Claims, 6 Drawing Sheets

|  |  | C1 | C2 | C3 | B1 | B2 |
|---|---|---|---|---|---|---|
| R RANGE | REVERSE |  |  | O |  | O |
| N RANGE | N |  |  |  |  | O |
| D RANGE | N |  |  |  | (O) | O |
|  | FIRST SPEED | O |  |  |  | O |
|  | SECOND SPEED | O |  |  | O |  |
|  | THIRD SPEED | O |  | O |  |  |
|  | FOURTH SPEED | O | O |  |  |  |
|  | FIFTH SPEED |  | O | O |  |  |
|  | SIXTH SPEED |  | O |  | O |  |

O:ENGAGING    BLANK: DISENGAGING

FIG. 4

| SHIFT PATTERN | GARAGE SHIF | ON/OFF SV | | | D RANGE | | | | | | N RANGE | | | | | | R RANGE | | | |
|---|---|---|---|---|---|---|---|---|---|---|---|---|---|---|---|---|---|---|---|---|
| | | S1 | S2 | S3 | C1 | C2 | C3 | B1 | B2 | C1 | C2 | C3 | B1 | B2 | C1 | C2 | C3 | B1 | B2 |
| 1 | | E | N | E | PL | | * | | △ | * | | | | △ | | | PL | | △ |
| 2 | | E | E | E | O | | | | △ | | | | | △ | | | □ | | △ |
| 3 | N→R N→D | N | E | E | □ | | | O | △ | * | | | | △ | | | □ | | △ |
| 4 | | N | N | E | PL | | * | O | △ | * | | | | △ | | | PL | | △ |
| 5 | | N | N | N | PL | | △ | O | * | * | △ | | | * | * | | △ | | PL |
| 6 | | E | N | N | PL | O | △ | | * | * | △ | | | * | * | | △ | | PL |
| 7 | | E | E | N | O | PL | △ | O | * | | * | △ | | * | * | * | △ | | PL |
| 8 | | N | E | N | PL | PL | △ | O | * | | * | △ | | * | * | * | △ | | PL |

ON/OFF SV  ENERGIZED "E"   NON-ENERGIZED "N"
FRICTIONAL ENGAGEMENT COMPONENT   O: FRICTIONAL ENGAGEMENT COMPONENT CONTROLLED BY FIRST CONTROL VALVE UNIT
△: FRICTIONAL ENGAGEMENT COMPONENT CONTROLLED BY SECOND CONTROL VALVE UNIT
□: FRICTIONAL ENGAGEMENT COMPONENT CONTROLLED BY THIRD CONTROL VALVE UNIT
*: MANUAL VALVE, RESIDUAL PRESSURE IS AVOIDED BY CHECK BALL

FIG. 7

HYDRAULIC CONTROL APPARATUS OF AUTOMATIC TRANSMISSION

CROSS REFERENCE TO RELATED APPLICATIONS

This application is based on and claims priority under 35 U.S.C. §119 with respect to Japanese Patent Application No. 2005-049149 filed on Feb. 24, 2005, the entire content of which is incorporated herein by reference.

BACKGROUND OF THE INVENTION

1. Field of the Invention

The present invention relates to a hydraulic control apparatus of an automatic transmission, and in particular it relates to a hydraulic control apparatus of an automatic transmission capable of improving the reliability during garage shifting.

2. Description of the Related Art

A conventional hydraulic control apparatus of an automatic transmission includes a plurality of control valves for regulating hydraulic pressure from an oil pump to hydraulic control pressure corresponding to the energization amount of a linear solenoid, a plurality of shift valves for switching frictional engagement elements having the hydraulic control pressure introduced from the control valve by switching the oil flow passage in accordance with energizing/non-energizing an on-off solenoid valve, and an electronic control unit for controlling the energizing the linear solenoid valve and the on-off solenoid valve so as to sift the transmission by combining the engagement and disengagement of a plurality of the frictional engagement elements. In such an apparatus, there are provided a plurality of frictional engagement elements such that the engagement between a first frictional engagement element (B2) and a second frictional engagement element (C3) achieves a reverse shift, and the engagement between the second frictional engagement element (C3) and a third frictional engagement element (C1) achieves a predetermined forward shift (see Japanese Unexamined Application Publication No. 2004-116734, FIGS. 2 and 3).

Figure 4:
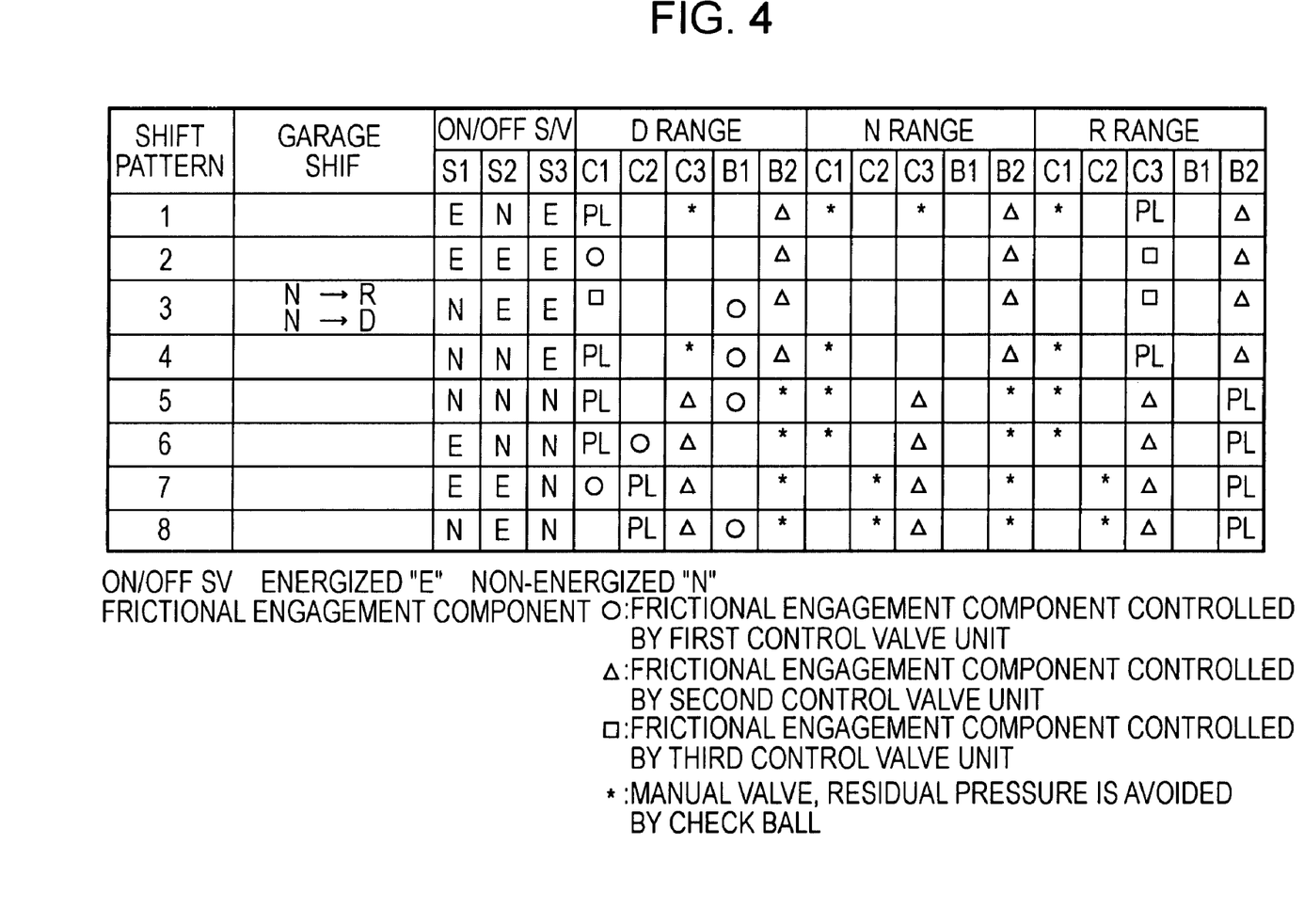
FIG. 4 is a table showing the relationship between the shift patterns (on-off patterns) and various drive ranges established in accordance with the control state by the hydraulic control unit in the hydraulic control apparatus of an automatic transmission according to the first embodiment of the present invention.

In the apparatus disclosed in Japanese Unexamined Application Publication No. 2004-116734, as shown in FIG. 4, when the transmission is shifted from N range to R range (garage shift N→R), shift pattern (on-off pattern) 2 is used while when shifted from N range to D range (garage shift N→D), shift pattern (on-off pattern) 3 is used. For controlling both the hydraulic pressures applied to the frictional engagement element during the garage shift N→R (third frictional clutch C3) and the frictional engagement element during the garage shift N→D (first frictional clutch C1), a third linear solenoid valve (reference numeral 24 of FIG. 5 in Japanese Unexamined Application Publication No. 2004-116734) is used.

During the garage shift N→R, the electronic control unit (reference numeral 4 of FIG. 2 in Japanese Unexamined Application Publication No. 2004-116734) determines that the oil flow passage of the manual valve (numeral 21 of FIG. 5 thereof) be switched to R range with the position switch signal from the position sensor (numeral 45 of FIG. 2 thereof) so as to shift the automatic transmission gear from N range to R range by changing the shift pattern (on-off pattern) to pattern 2 so as to control the hydraulic pressure applied to the third frictional clutch C3 using the third linear solenoid valve (numeral 24 of FIG. 5 thereof).

During the garage shift N→D, the electronic control unit (reference numeral 4 of FIG. 2 in Japanese Unexamined Application Publication No. 2004-116734) determines that the oil flow passage of the manual valve (numeral 21 of FIG. 5 thereof) be switched to D range with the position switch signal from the position sensor (numeral 45 of FIG. 2 thereof) so as to shift the automatic transmission gear from N range to R range by changing the shift pattern (on-off pattern) to pattern 3 so as to control the hydraulic pressure applied to the first frictional clutch C1 using the third linear solenoid valve (numeral 24 of FIG. 5 thereof).

During the garage shift N→D and the garage shift N→R, although the oil flow passage of the manual valve is switched, if it cannot be determined whether the transmission is shifted N→R or shifted N→D due to the failure of the position sensor or the stoppage of the position sensor at a non-signal position, the transmission shift cannot be started because it cannot be determined to have the shift pattern (on-off pattern) for the garage shift N→D or the shift pattern (on-off pattern) for the garage shift N→R.

Hence, in the apparatus disclosed in Japanese Unexamined Application Publication No. 2004-116734, in order to start the transmission shift by detecting the manual valve whether being at D range or at R range, the electronic control unit detects the manual valve whether being at D range or at R range by providing hydraulic pressure switches in any one of or both the oil flow passage pressurized by the manual valve at D range and the oil flow passage pressurized at R range so as to detect the signal from the hydraulic pressure switches.

However, increase in the number of hydraulic pressure switches in such a manner increases the cost of the apparatus. Also, if the hydraulic pressure switch breaks, the manual valve cannot be detected whether being at D range or at R range.

Since the straight hydraulic pressure control is generally configured to control the hydraulic pressure of one engagement element by one electromagnetic valve (solenoid valve), a shift valve is not used for switching the oil flow passage. In such a case, since the electromagnetic valve for controlling the hydraulic pressure applied to the third frictional clutch C3 during the garage shift N→D is different from that for controlling the hydraulic pressure applied to the first frictional clutch C1 during the garage shift N→R, D range and R range are detected by predetermined means.

On the other hand, in the apparatus disclosed in Japanese Unexamined Application Publication No. 2004-116734, in the apparatus disclosed in the Publication, the third linear solenoid valve controls both the hydraulic pressure applied to the third frictional clutch C3 during the garage shift N→D and that applied to the first frictional clutch C1 during the garage shift N→R, the apparatus cost can be reduced by reducing the number of electromagnetic valves.

However, in the apparatus, the shift pattern (on-off pattern) 3 during the garage shift N→D is different from the shift pattern (on-off pattern) 2 during the garage shift N→R, and the position sensor determines whether the position shift is N→D or N→R with the position switch signal, so that the determination response may be delayed. Also, if the position sensor brakes, the shift pattern (on-off pattern) cannot be switched during the garage shift.

SUMMARY OF THE INVENTION

Accordingly, it is an object of the present invention to improve the reliability of a hydraulic control apparatus during garage transmission shift while reducing the cost of the apparatus.

According to the present invention, in a hydraulic control apparatus of an automatic transmission for shifting a transmission ratio with the combination of hydraulic pressures applied to/released from a plurality of frictional engagement elements, the hydraulic control apparatus includes a manual valve for introducing a line pressure thereto from an oil pump and being capable of switching the line pressure destination in accordance with a shift position of a manual lever so that when a manual spool is located at positions respectively corresponding to the drive position and the reverse position of the manual lever, the line pressure is output to destinations different from each other, respectively; a control valve for introducing the line pressure output from the manual valve thereto so as to output a control hydraulic pressure by adjusting the line pressure; a plurality of shift valves for switching the oil flow passage between the control valve and a first engagement element or a second engagement element in accordance with the respective positions of shift valve spools; a plurality of on-off solenoid valves for introducing the line pressure output from the manual valve thereto as well as for controlling the position of the respective shift valve spools of the shift valve by applying/releasing the line pressure in accordance with energization/non-energization (on/off of electric currrent supply); and an electronic control unit having a plurality of shift patterns (on-off patterns) (on-off pattern) accommodated therein, which define the energization/non-energization (on/off of electric currrent supply) for each of the on-off solenoid valves, for controlling the energization/non-energization (on/off of electric currrent supply) of the on-off solenoid valves, wherein among a plurality of the shift patterns (on-off patterns) (on-off pattern) of the electronic control unit, the shift pattern (on-off pattern) during a first garage shifting when the manual spool is switched from the neutral position to a drive position by the operation of the manual lever is the same as that during a second garage shifting when being switched from the neutral position to the reverse position, and wherein the control valve controls the hydraulic pressure applied to the first engagement element during the first garage shifting while controlling the hydraulic pressure applied to the second engagement element during the second garage shifting.

Preferably, among a plurality of the on-off solenoid valves, a predetermined on-off solenoid valve is configured so that the line pressure is introduced thereto from the manual valve when the manual spool is located at a drive position while being not introduced thereto when the manual spool is located at the neutral position and the reverse position, and wherein a predetermined shift valve among a plurality of the shift valves is configured so that it is not controlled by the predetermined on-off solenoid valve when the line pressure is not introduced to the predetermined on-off solenoid valve while being controlled by the predetermined on-off solenoid valve when the line pressure is introduced to the predetermined on-off solenoid valve.

Preferably, in a plurality of the shift patterns (on-off patterns) (on-off pattern) of the electronic control unit, the predetermined on-off solenoid valve during the first garage shifting and the second garage shifting has the shift pattern (on-off pattern) in the non-energized state.

Preferably, the hydraulic control apparatus further includes a fail valve for blocking off or switching the oil flow passage between the shift valves in accordance with the hydraulic pressure applied from the manual valve.

Preferably, during the first garage shifting, part of the line pressure output from the manual valve enters the fail valve.

Preferably, the hydraulic control apparatus includes three control valves, four shift valves, and five frictional engagement elements so as to achieve six forward ratios and one reverse ratio.

Preferably, the control valve includes part of the solenoid valve integrated thereto.

According to the present invention, since the transmission can be started shifting without determining whether the garage shift N→D or the garage shift N→R using the signal of detecting means such as a hydraulic pressure switch by the electronic control unit, costs of the apparatus can be reduced by decreasing the number of the hydraulic pressure switches. That is, when the straight hydraulic pressure control is performed using the shift valve, the shift pattern (on-off pattern) during the garage shift N→D is equalized to that during the garage shift N→R, and moreover the same electromagnetic valve can be used even when the engagement element during the garage shift N→D is different from that during the garage shift N→R, so that the control system is equalized to that in a conventional hydraulic pressure control apparatus using no straight hydraulic pressure control, in which when the manual valve is switched to D range, an accumulator is operated by the manual valve via an orifice so as to apply the hydraulic the pressure to the engagement element during the garage shift N→D while when being switched to R range, to apply the hydraulic the pressure to the engagement element during the garage shift N→R. Thus, despite of the signal from the position sensor, an electromagnetic valve with the same waveform as that detected by the accumulator can achieve the equivalent control system. Since the shock can be reduced by detecting the revolution speed (turbine revolution speed) of an input shaft through the input shaft rev sensor so as to adjust an accumulator effect, problems, such as the failure of the position sensor and the hydraulic the pressure switch, and the response delay of the shift pattern (on-off pattern) determination by the electronic control unit, can be prevented, so that the reliability during the garage shifting is improved.

DESCRIPTION OF THE PREFERRED EMBODIMENTS

First Embodiment

Figure 1:
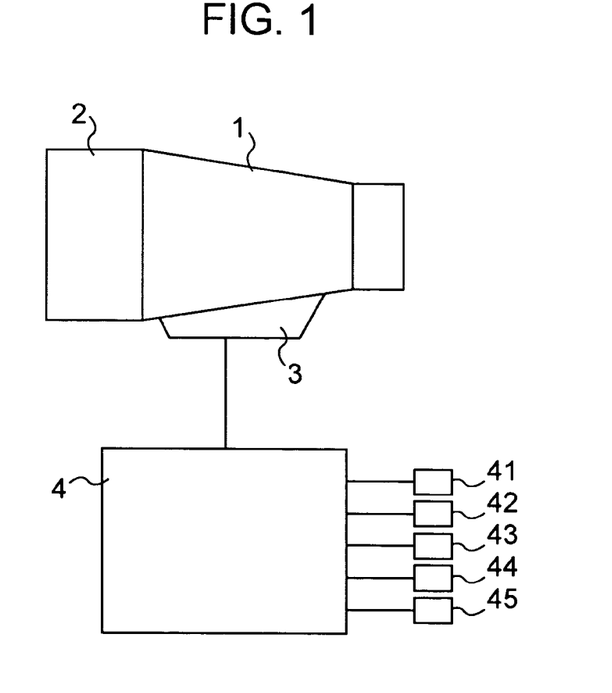
FIG. 1 is a schematic view of the entire configuration of a hydraulic control apparatus of an automatic transmission according to a first embodiment of the present invention.

A hydraulic control apparatus of an automatic transmission according to a first embodiment of the present invention will be described with reference to the drawings. FIG. 1 is a schematic view of the entire configuration of the hydraulic control apparatus of an automatic transmission according to the first embodiment of the present invention. The hydraulic control apparatus of an automatic transmission includes an automatic transmission 1, a hydraulic control unit 3, and an electronic control unit 4. The automatic transmission 1 is connected to an output shaft (not shown) of an engine 2. The hydraulic control unit 3 controls the hydraulic pressure applied to hydraulic frictional engagement elements (not shown) assembled within the automatic transmission 1. The electronic control unit 4 controls a solenoid (not shown) provided within the hydraulic control unit 3.

The electronic control unit 4, having a microcomputer, is connected to an engine rev sensor (Ne sensor) 41, an input shaft rev sensor (Nt sensor) 42, an output shaft rev sensor (No sensor) 43, a travel sensor (θ sensor) 44, and a position sensor 45. The engine rev sensor (Ne sensor) 41 detects the revolution speed Ne of the output shaft of the engine 2. The input shaft rev sensor (Nt sensor) 42 detects the revolution speed Nt (turbine revolution speed) of an input shaft 11 of the automatic transmission 1. The output shaft rev sensor (No sensor) 43 detects the revolution speed No (equivalent to a vehicle speed of the vehicle). The travel sensor (θ sensor) 44 detects the throttle travel θ of the engine 2 (equivalent to an engine load). The position sensor 45 detects the position (drive range) of a selector lever shifted by a driver. The electronic control unit 4 controls the energization to first to third control valve units (numerals 22 to 24 of FIG. 5) and on-off solenoid valves (numerals 35 to 37 of FIG. 5) on the basis of output data or signals of the sensors 41 to 45 and data including shift pattern (on-off pattern). Thereby, a desired transmission shift is achieved (see FIG. 3) by having any one of the shift patterns (on-off patterns) (on-off pattern) (see FIG. 4) selected.

Figure 2:
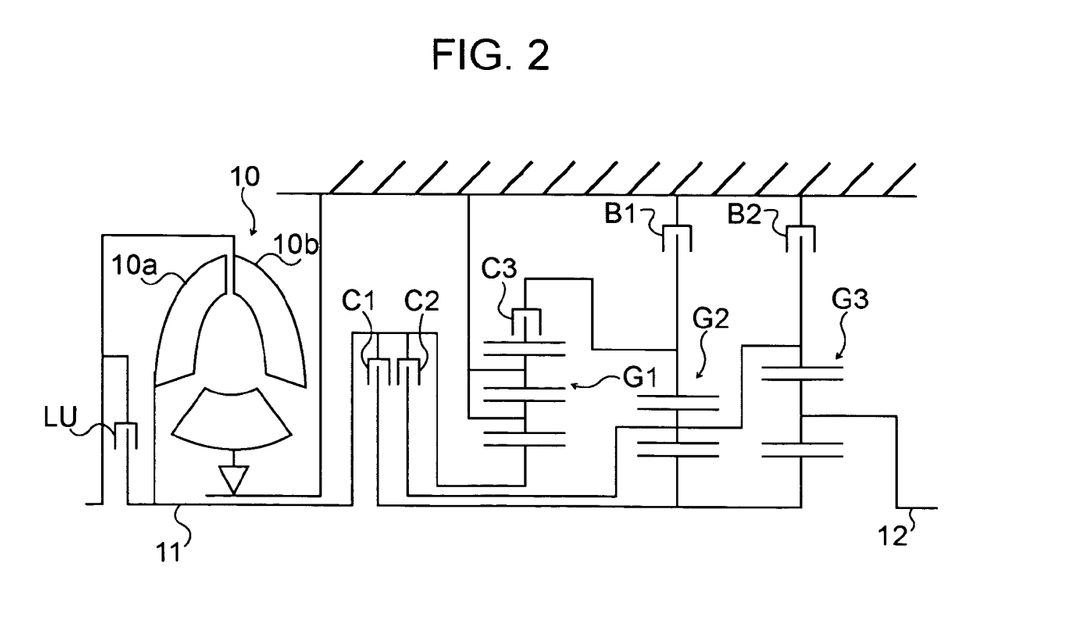
FIG. 2 is a skeleton drawing of the automatic transmission in the hydraulic control apparatus of an automatic transmission according to the first embodiment of the present invention.

FIG. 2 is a skeleton drawing of the automatic transmission in the hydraulic control apparatus of an automatic transmission according to the first embodiment of the present invention. The automatic transmission 1 (FIG. 1) includes a torque converter 10, the input shaft 11, the output shaft 12, a first-train double-pinion planetary gear G1, a second-train single-pinion planetary gear G2, and a third-train single-pinion planetary gear G3. The torque converter 10, which is connected to the output shaft of the engine 2 (FIG. 1), includes a lock-up clutch LU for directly connecting an input pump impeller 10b and an output turbine runner 10a of the torque converter 10 together when the revolution speed difference between them is small, in order to avoid the power transmission loss due to hydraulic slippage. The input shaft 11 is the output shaft of the torque converter 10. The output shaft 12 is connected to an axle via a differential drive (not shown). The first-train double-pinion planetary gear G1, the second-train single-pinion planetary gear G2, and the third-train single-pinion planetary gear G3 are connected to the input shaft 11. In the automatic transmission 1, a first frictional clutch C1, a second frictional clutch C2, a third frictional clutch C3, a first frictional brake B1, a second frictional brake B2, and the lock-up clutch LU are assembled as multiple (six) frictional engagement elements. In the automatic transmission 1, the hydraulic control unit 3 (FIG. 1) and the electronic control unit 4 (FIG. 1) select the engagement/disengagement of the first to third frictional clutches C1 to C3 and the first and second frictional brakes B1 and B2 so as to switch the transmission shift and the shift pattern. The lock-up clutch LU is brought into engagement by the control of the hydraulic control unit 3 and the electronic control unit 4, when the revolution speed difference between the pump impeller 10b and the turbine runner 10a is small at a forward shift. The first to third frictional clutches C1 to C3, the first and second frictional brakes B1 and B2, and the lock-up clutch LU are brought into engagement when being set at high pressure by the hydraulic control unit 3 while being brought into disengagement when being set at low pressure.

Figure 3:
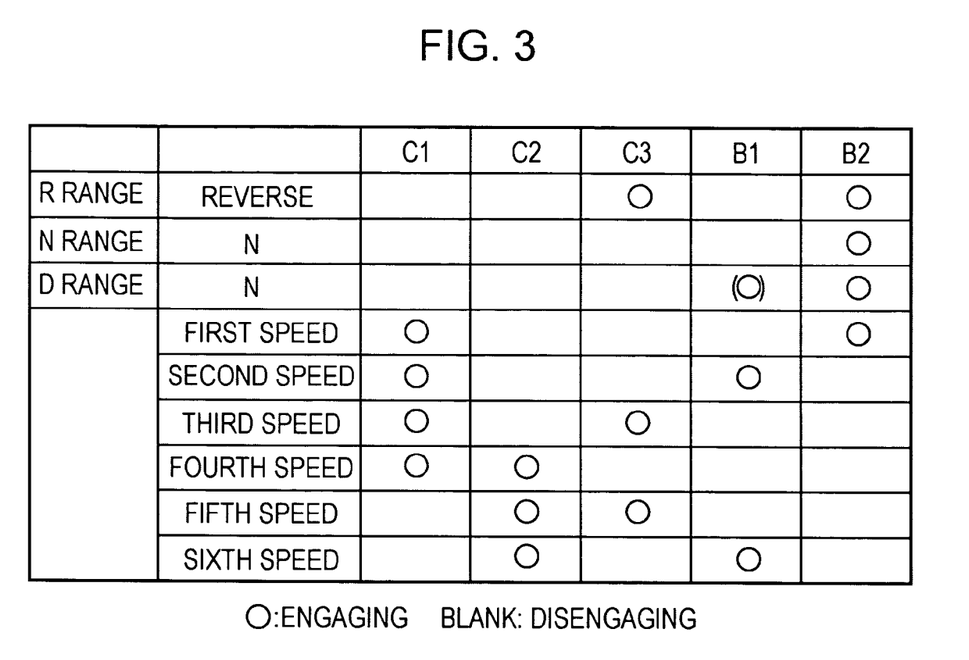
FIG. 3 is a table showing the relationship between the engagement/disengagement of first to third frictional clutches C1 to C3 and first and second frictional brakes B1 and B2, and transmission shifts corresponding thereto in the hydraulic control apparatus of an automatic transmission according to the first embodiment of the present invention.

FIG. 3 is a table showing the relationship between the engagement/disengagement of the first to third frictional clutches C1 to C3 and the first and second frictional brakes B1 and B2, and the transmission shifts corresponding thereto in the hydraulic control apparatus of an automatic transmission according to the first embodiment of the present invention. The automatic transmission 1 is a transmission with six forward and one reverse ratios having one reverse shift, one neutral position, first to fourth speed under drives, and fifth and sixth speed over drives. That is, when the third frictional clutch C3 and the second frictional brake B2 are only brought into engagement, the output shaft 12 is rotated in reverse to the input shaft 11 so as to drive the vehicle reversely. Also, when only the second frictional brake B2 is brought into engagement, the neutral position is achieved. When the first frictional clutch C1 and the second frictional brake B2 are only brought into engagement, the first speed drive is achieved. When the first frictional clutch C1 and the first frictional brake B1 are only brought into engagement, the second speed drive is achieved. When the first and third frictional clutches C1 and C3 are only brought into engagement, the third speed drive is achieved. When the first and second frictional clutches C1 and C2 are only brought into engagement, the fourth speed drive is achieved. When the second and third frictional clutches C2 and C3 are only brought into engagement, the fifth speed drive is achieved. When the second frictional clutch C2 and the first frictional brake B1 are only brought into engagement, the sixth speed drive is achieved. In addition, the basic relationship between the drive ranges (R range, N range, and D range) to be selected by the shifting of the selector lever (not shown) by a driver and the transmission shifts is also shown in FIG. 3.

Figure 5:
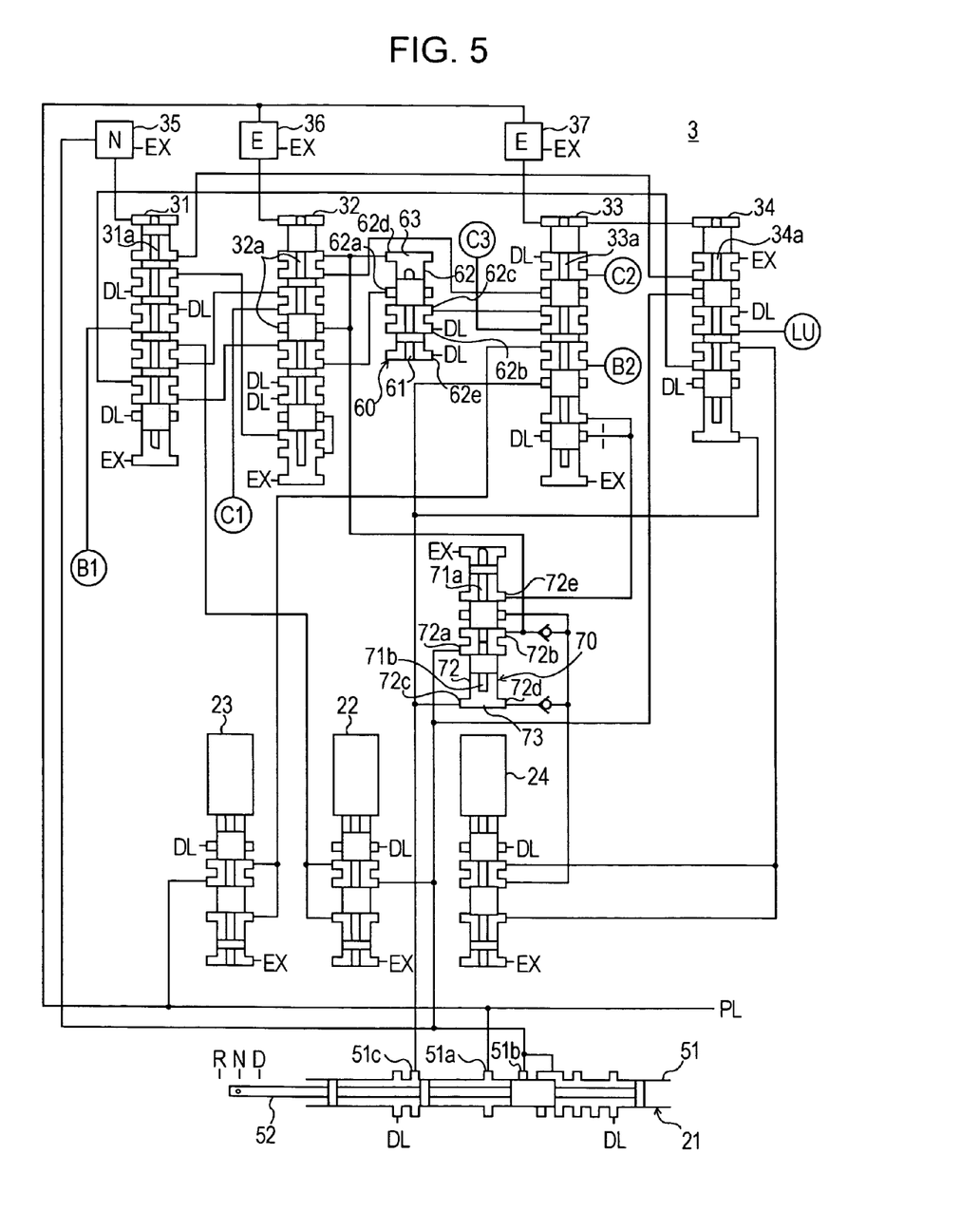
FIG. 5 is a partial hydraulic circuit diagram schematically showing the configuration of a hydraulic control unit in a control state at N range in the hydraulic control apparatus of an automatic transmission according to the first embodiment of the present invention.
Figure 6:
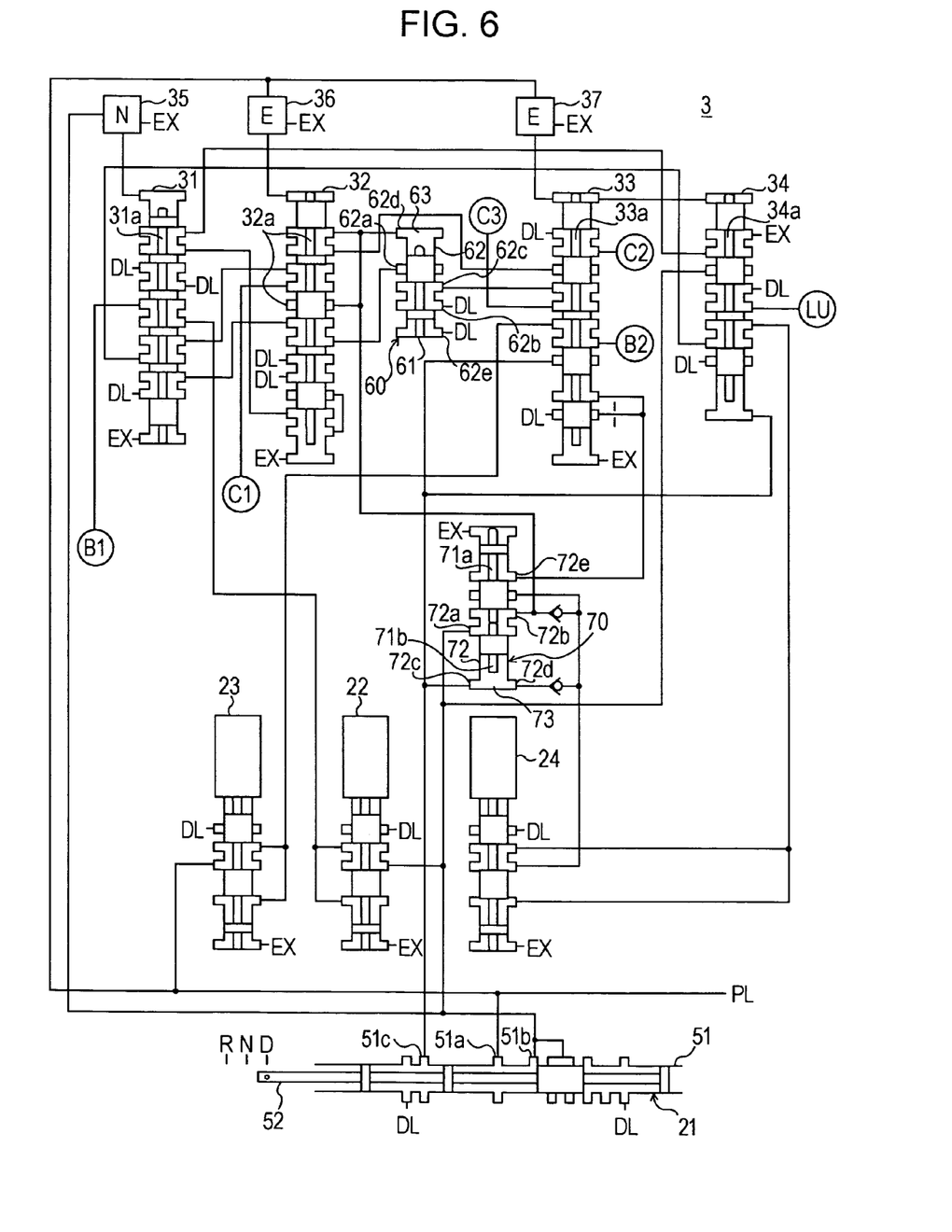
FIG. 6 is a partial hydraulic circuit diagram schematically showing the configuration of the hydraulic control unit in a control state at D range in the hydraulic control apparatus of an automatic transmission according to the first embodiment of the present invention.
Figure 7:
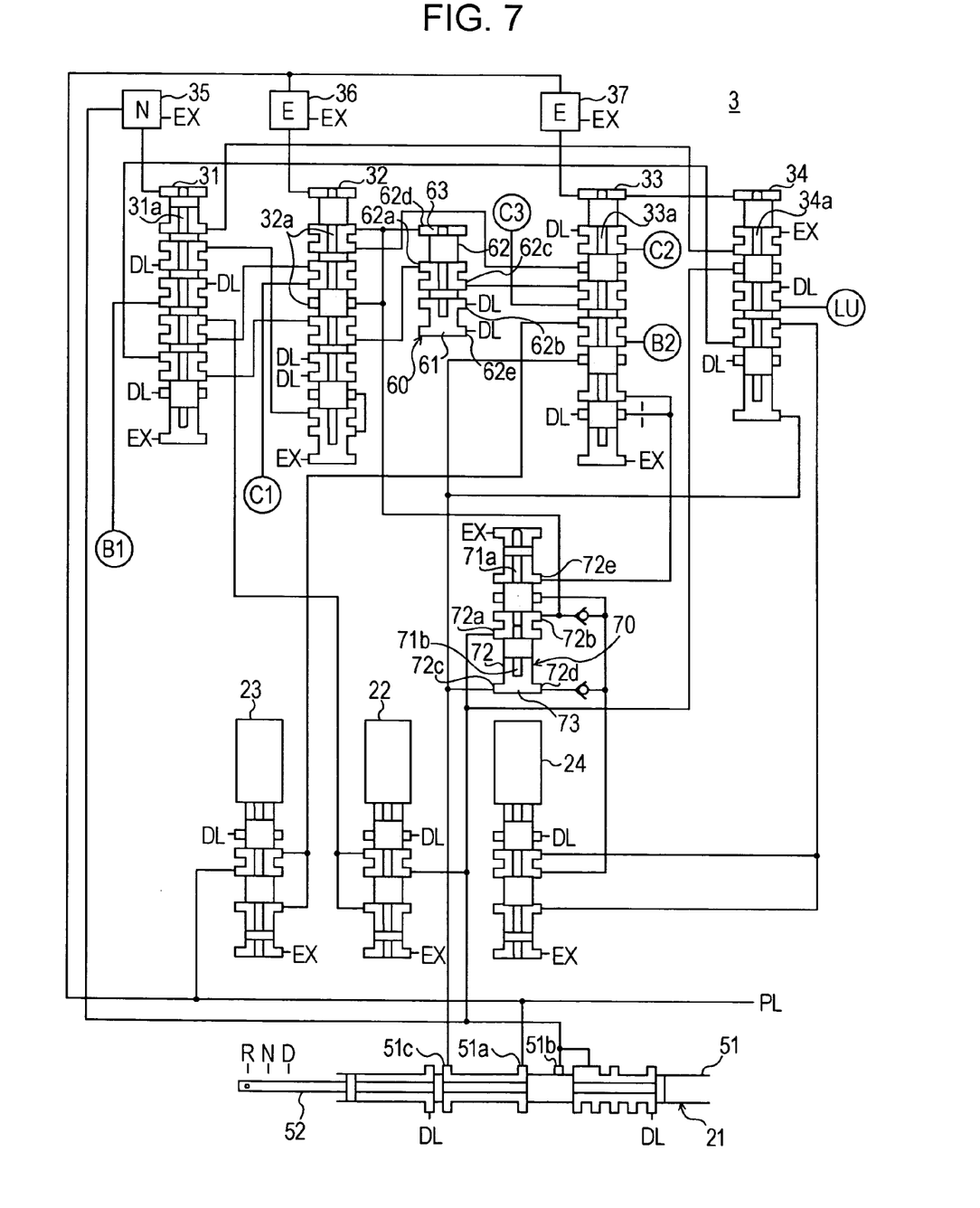
FIG. 7 is a partial hydraulic circuit diagram schematically showing the configuration of the hydraulic control unit in a control state at R range in the hydraulic control apparatus of an automatic transmission according to the first embodiment of the present invention.

Then, the configuration and control manner of the hydraulic control unit in the hydraulic control apparatus of an automatic transmission according to the first embodiment of the present invention will be described with reference to the drawings. FIG. 4 is a table showing the relationship between the shift patterns (on-off patterns) and various drive ranges established in accordance with the control state by the hydraulic control unit in the hydraulic control apparatus of an automatic transmission according to the first embodiment of the present invention. FIGS. 5 to 7 are partial hydraulic circuit diagrams schematically showing the configuration of the hydraulic control unit in the hydraulic control apparatus of an automatic transmission according to the first embodiment of the present invention.

As shown in FIGS. 5 to 7, the hydraulic control unit 3 introduces a line pressure PL produced on the basis of the delivery pressure from an oil pump (not shown). When the first to third frictional clutches C1 to C3 and the first and second frictional brakes B1 and B2 are brought into disengagement, the hydraulic control unit 3 also releases the hydraulic pressure from each frictional engagement element to a hydraulic circuit (preload circuit) established at a low pressure DL. When each frictional engagement element is in a disengagement state, the low pressure DL is established to have a pressure higher than the atmospheric pressure EX so as to prevent air from entering each frictional engagement element as well as lower than the pressure, under which each frictional engagement element is brought into engagement. Hence, the frictional engagement element that has been at an engagement state is communicated with the preload circuit at the low pressure DL so as to release its hydraulic pressure.

The hydraulic control unit 3 includes the manual valve 21, the first control valve unit 22, the second control valve unit 23, the third control valve unit 24, a first shift valve 31, a second shift valve 32, a third shift valve 33, a fourth shift valve 34, a first on-off solenoid valve 35, a second on-off solenoid valve 36, a third on-off solenoid valve 37, a fail valve 60, and a drain valve 70. The manual valve 21 switches the hydraulic circuit operatively connected to the drive ranges to be selected by the shifting of the selector lever (manual lever, not shown). The first to third control valve units 22 to 24 output the adjustment pressure corresponding to the energizing current using the line pressure PL. The first to fourth shift valves 31 to 34 directly switch the oil flow passage. The first to third on-off solenoid valves 35 to 37 switch the operation states of the first to fourth shift valves 31 to 34, which correspond to the switching of energization/non-energization (on/off of electric currrent supply). The fail valve 60 switches on/off of the oil flow passage between the second shift valve 32 and the third shift valve 33. The drain valve 70 switches the oil flow passage using the low pressure DL (higher than the atmospheric pressure EX, at D range, and N range) from the manual valve 21 or the line pressure PL (at R range). The control valve units 22 to 24 and the shift valves 31 to 34 are provided with respective coil springs (not shown) arranged for urging the first to fourth shift valve spools 31a to 34a upward in the drawing. The fail valve 60 is also provided with a coil spring (not shown) arranged for urging a valve body 61 upward in the drawing. The drain valve 70 is also provided with a coil spring (not shown) arranged for urging a valve body 61 downward in the drawing.

The manual valve 21 is provided with a manual spool 52 that slides in a casing 51 drivingly in associated with the operation of the manual lever. The manual valve 21 includes a first port (inlet port of the line pressure) 51a, a second port (outlet port of the line pressure) 51b, and a third port (outlet port of the line pressure) 51c. The first port 51a is for introducing the line pressure PL. The second port 51b, which is connected to the first on-off solenoid valve 35, the first control valve unit 22, and the drain valve 70, outputs the line pressure PL introduced from the first port 51a when the manual spool 52 is positioned at D range while communicating with the preload circuit at the low pressure DL when the manual spool 52 is positioned at N range and R range. The third port 51c, which is connected to the third shift valve 33, the fourth shift valve 34, and the drain valve 70, outputs the line pressure PL introduced from the first port 51a when the manual spool 52 is positioned at R range while communicating with the preload circuit at the low pressure DL when the manual spool 52 is positioned at N range and D range.

The first to third control valve units 22 to 24 are respective units in that the control valve is integrated with the linear solenoid valve. The first control valve unit 22 can introduce the line pressure PL output from the manual valve 21 positioned at D range so as to produce the control hydraulic pressure from the introduced line pressure PL. The first control valve unit 22 communicates with the preload circuit at the low pressure DL when the manual valve 21 is positioned at N range and R range. The second control valve unit 23 can introduce the line pressure PL output from the manual valve 21 positioned at any range so as to produce the control hydraulic pressure from the introduced line pressure PL. The third control valve unit 24 can introduce the line pressure PL output from the manual valve 21 positioned at D range via the drain valve 70 so as to produce the control hydraulic pressure from the introduced line pressure PL. The third control valve unit 24 communicates with the preload circuit at the low pressure DL via the drain valve 70 when the manual valve 21 is positioned at N range and R range. The first to third control valve units 22 to 24 do not output the adjustment pressure in the non-energized state while outputting the adjustment pressure increasing with increasing energizing current in the energized state.

To the first to fourth shift valves 31 to 34, the line pressure PL or the control hydraulic pressure output from the first to third control valve units 22 to 24 is introduced, while turning on/off the supply of the line pressure PL or the control pressure to the first to third frictional clutches C1 to C3, the first and second frictional brakes B1 and B2, and the lock-up clutch LU in accordance with the operation state that corresponds to the supplied hydraulic pressure.

The first and second on-off solenoid valves 35 and 36 turn on/off the supply of the hydraulic pressure to the first and second shift valves 31 and 32 in accordance with the energizing current so as to switch the operation state. The third on-off solenoid valve 37 turns on/off the supply of the hydraulic pressure to both the third and fourth shift valves 33 and 34 in accordance with the energizing current so as to simultaneously switch the operation state.

To the first on-off solenoid valve 35, when the manual valve 21 is positioned at D range, the line pressure PL is introduced via the manual valve 21 while when the manual valve 21 is positioned at N range and R range, the preload circuit at the low pressure DL communicates via the manual valve 21. To the second and third on-off solenoid valves 36 and 37, the line pressure PL is introduced.

The first to third on-off solenoid valves 35 to 37 supply the hydraulic pressure to the first to fourth shift valves 31 to 34 in the non-energized state while do not supply the hydraulic pressure to the first and second shift valves 31 and 32 in the energized state. The first to fourth shift valves 31 to 34 are established in a first operation state (a state in which first to fourth shift valve spools 31a to 34a are arranged downward in FIGS. 5 to 7) when the hydraulic pressure is supplied thereto from the on-off solenoid valves 35 to 37, while being established in a second operation state (a state in which the first to fourth shift valve spools 31a to 34a are arranged upward in FIGS. 5 to 7) when the hydraulic pressure is stopped supplying.

The fail valve 60 includes a valve body 61 sliding in a cylinder 62 corresponding to the hydraulic pressure supplied to an oil chamber 63. The cylinder 62 includes a first port 62a, a second port 62b, a third port 62c, a fourth port 62d, and a fifth port 62e. The first port 62a is connected to the second shift valve 32; the second port 62b is connected to the preload circuit at the low pressure DL; the third port 62c is connected to the third shift valve 33; the fourth port 62d is connected to the second port 51b of the manual valve 21 via the drain valve 70 so as to communicate with the oil chamber 63; and the fifth port 62e is connected to the preload circuit at the low pressure DL. The valve body 61 of the fail valve 60 is located at an upper position in the drawing by the urging force of the coil spring (not shown) when the hydraulic pressure is not applied to the oil chamber 63 (at N range or at R range) so as to communicate the second shift valve 32 with the third shift valve 33 through the oil flow passage. On the other hand, when the hydraulic pressure is applied to the oil chamber 63 (at D range), the coil spring (not shown) is compressed so as to locate the valve body 61 of the fail valve 60 at a lower position of the drawing and to block off the oil flow passage between the second shift valve 32 and the third shift valve 33.

The drain valve 70 includes a valve body 71 (71a, 71b) sliding in a cylinder 72 corresponding to the hydraulic pressure supplied to an oil chamber 73. The cylinder 72 includes a first port 72a, a second port 72b, a third port 72c, a fourth port 72d, and a fifth port 72e. The first port 72a is connected to the second port 51b of the manual valve 21; the second port 72b is connected to the second shift valve 32 and the fail valve 60 as well as to the downstream of the free flow of a check ball so as to connect the third control valve unit 24 via the check ball; the third port 72c is connected to the third port 51c of the manual valve 21 so as to communicate with the oil chamber 73; the fourth port 72d is connected to the upstream of the free flow of the check ball so as to connect the third control valve unit 24 via the check ball and communicate with the oil chamber 73; and the fifth port 72e is connected to the third shift valve 33. The valve body 71 is located at a lower position in the drawing by the urging force of the coil spring (not shown) when the hydraulic pressure is not applied to the oil chamber 73. To the oil chamber 73 of the drain valve 70, a hydraulic pressure higher than the atmospheric pressure EX (the low pressure DL at D range, the line pressure PL at N range and R range) is applied when the manual valve 21 is positioned at D range so as to locate the valve body 71 at an upper position of the drawing.

Then, the relationship between the control states of the hydraulic control unit and shift patterns (on-off patterns) in the hydraulic control apparatus of an automatic transmission according to the first embodiment of the present invention will be described. As shown in FIG. 4, there are eight shift patterns (on-off patterns) 1 to 8 for shifting the transmission according to the embodiment. That is, the eight shift patterns (on-off patterns) are achieved by combinations of the energized/non-energized states of the on-off solenoid valves 35 to 37 (operation states of the first to fourth shift valves 31 to 34). FIG. 5 shows the control state of the hydraulic control unit corresponding to shift pattern 3 at N range in FIG. 4; FIG. 6 shows the control state of the hydraulic control unit corresponding to shift pattern 3 at D range in FIG. 4; and FIG. 7 shows the control state of the hydraulic control unit corresponding to shift pattern 3 at R range in FIG. 4.

Referring to FIG. 4, symbol ○ denotes the frictional engagement element controllable by the first control valve unit 22; symbol A denotes the frictional engagement element controllable by the second control valve unit 23; symbol □ denotes the frictional engagement element controllable by the third control valve unit 24; and symbol * located at upper right within the column denotes the frictional engagement element in the disengaged state in that a hydraulic pressure (high pressure) can leak from an adjacent port of various valves thereto. Also, symbol S1 in the column of the on-off solenoid valve (ON/OFF S/V) denotes the first on-off solenoid valve 35; symbol S2 the second on-off solenoid valve 36; and symbol S3 the third on-off solenoid valve 37.

Both during the garage shift N→D and the garage shift N→R, shift pattern 3 is maintained in that the first on-off solenoid valve (S1) is non-energized; the second on-off solenoid valve (S2) is energized; and the third on-off solenoid valve (S3) is energized (the first shift valve 31 is in the first operation state and the second to fourth shift valves 32 to 34 are in the second operation state). Both the linear solenoid valve unit controlling the hydraulic pressure applied to the first frictional clutch C1 during the garage shift N→D and the linear solenoid valve unit controlling the hydraulic pressure applied to the third frictional clutch C3 are the third control valve unit 24 (symbol □).

The state during the garage shift N→D will be described with reference to FIGS. 5 and 6. During the garage shift N→D, shift pattern 3 is maintained. In this state, while the first on-off solenoid valve 35 is maintained to be in the non-energized state, the first shift valve 31 is changed from the second operation state (the first shift valve spool 31a is located in an upper position in the drawing) to the first operation state (the first shift valve spool 31a is located in a lower position in the drawing). The reason is that as the line pressure PL is not applied to the first on-off solenoid valve 35 via the manual valve 21 (the first on-off solenoid valve 35 communicates with the preload circuit at the low pressure DL via the manual valve 21), although the first on-off solenoid valve 35 is in the non-energized state, the first shift valve 31 cannot be changed to the first operation state (a first shift valve spool 31a is located in a lower position in the drawing). When the range is shifted from N range to D range, the line pressure PL is applied to the first on-off solenoid valve 35 via the manual valve 21 so as to energize the first on-off solenoid valve 35 so that the first shift valve 31 is changed to be the first operation state. Also, while the second and third on-off solenoid valves 36 and 37 are maintained in the energized state, the second to fourth shift valves 32 to 34 are maintained in the second operation state. The state in that the line pressure PL is introduced to the manual valve 21 is not changed and the line pressure PL is started being output from the second port 51b. In the fail valve 60, the line pressure PL is started being output to the oil chamber 63 via the manual valve 21.and the drain valve 70. Also, the line pressure PL is started being output to the first control valve unit 22 via the manual valve 21 so that the control hydraulic pressure can be applied to the first frictional brake B1 via the first shift valve 31. The second control valve unit 23 is maintained in a state in that the line pressure PL is applied thereto, and the control hydraulic pressure can be applied to the second frictional brake B2 via the third shift valve 33. The third control valve unit 24 is started to be a state in that the line pressure PL is applied thereto via the manual valve 21 and the drain valve 70, and the control hydraulic pressure can be applied to the first frictional clutch C1 via the first and second shift valves 31 and 32 and the fourth shift valve 34. Since the second frictional clutch C2 is maintained to be connected to the preload circuit at the low pressure DL via the third shift valve 33, the second frictional clutch C2 cannot be brought into engagement. Since the first frictional brake B1 is maintained to be connected to the preload circuit at the low pressure DL via the first shift valve 31, the first frictional brake B1 cannot be brought into engagement. Thus, the state in that the control hydraulic pressure from the second control valve unit 23 is high is changed to the state in that the control hydraulic pressure from the second control valve unit 23 and the third control valve unit 24 is increased to be high, so that the shift is changed from the neutral position where only the second frictional brake B2 is brought into engagement to the forward first speed range where the second frictional brake B2 and the first frictional clutch C1 are brought into engagement so as to drive the vehicle forward (see FIG. 3). In addition, during the garage shift N→D, the control hydraulic pressure from the second control valve unit 23 is not increased to be high.

The state during the garage shift N→R will be described with reference to FIGS. 5 and 7. During the garage shift N→R, shift pattern 3 is maintained in the same way as during the garage shift N→D. In this state, while the first on-off solenoid valve 35 is maintained to be in the non-energized state, the first shift valve 31 is maintained to be in the second operation state (the first shift valve spool is located in an upper position in the drawing). The reason is that as the line pressure PL is not applied to the first on-off solenoid valve 35 via the manual valve 21 (the first on-off solenoid valve 35 communicates with the preload circuit at the low pressure DL via the manual valve 21) at N range and R range, although the first on-off solenoid valve 35 is in the non-energized state, the first shift valve 31 cannot be changed to the first operation state (the first shift valve spool 31a is located in a lower position in the drawing). Also, while the second and third on-off solenoid valves 36 and 37 are maintained in the energized state, the second to fourth shift valves 32 to 34 are maintained in the second operation state. The state in that the line pressure PL is introduced to the manual valve 21 is not changed, and the line pressure PL is started being output from the third port 51c. In the fail valve 60, the line pressure PL is started being output to the oil chamber 63 via the manual valve 21 and the drain valve 70. Since the first control valve unit 22 is maintained to communicate with the preload circuit at the low pressure DL via the manual valve 21, the first control valve unit 22 does not apply the control hydraulic pressure to the frictional engagement elements. The second control valve unit 23 is maintained in a state in that the line pressure PL is applied thereto and the control hydraulic pressure can be applied to the second frictional brake B2 via the third shift valve 33. The third control valve unit 24 is started to be a state in that the line pressure PL is applied thereto via the manual valve 21 and the drain valve 70, and the control hydraulic pressure can be applied to the third frictional clutch C3 via the fourth shift valve 34, the first and second shift valves 31 and 32, the fail valve 60, and the third shift valve 33. The first frictional clutch C1 is maintained to communicate with the first control valve unit 22 via the second shift valve 32 and the first shift valve 31; however, since the first control valve unit 22 is maintained to communicate with the preload circuit at the low pressure DL, the first frictional clutch C1 cannot be brought into engagement. Since the second frictional clutch C2 is maintained to communicate with the preload circuit at the low pressure DL via the third shift valve 33, it cannot be brought into engagement. Since the first frictional brake B1 is maintained to communicate with the preload circuit at the low pressure DL via the first shift valve 31, it cannot be brought into engagement. Thus, the state in that the control hydraulic pressure from the second control valve unit 23 is to be high is changed to the state in that the control hydraulic pressure from the second control valve unit 23 and the third control valve unit 24 is increased to be high, so that the shift is changed from the neutral position where only the second frictional brake B2 is brought into engagement to the reverse range where the second frictional brake B2 and the third frictional clutch C3 are brought into engagement so as to drive the vehicle rearward (see FIG. 3).

According to the first embodiment, the case including the shift valve has been described; when the same electromagnetic valve is used during the garage shift N→D and during the garage shift N→R, another electromagnetic valve may be used if the signal thereof is the same or negligibly different. According to the first embodiment, the case, where the control valve unit in which the linear solenoid valve is integrated with the control valve is used, has been described; alternatively, the linear solenoid valve may be separated from the control valve.

According to the first embodiment, since the transmission can be started shifting without determining whether the garage shift N→D or the garage shift N→R using the signal of detecting means such as a hydraulic pressure switch by the electronic control unit, costs of the apparatus can be reduced by decreasing the number of the hydraulic pressure switches. Also, problems, such as the failure of the position sensor and the response delay of the shift pattern determination by the electronic control unit, can be prevented, so that the reliability during the garage shift is improved.

What is claimed is:

1. A hydraulic control apparatus of an automatic transmission for shifting a transmission ratio with the combination of hydraulic pressures applied to/released from a plurality of frictional engagement elements, the apparatus comprising:

a manual valve for introducing a line pressure thereto from an oil pump and switching an outlet port of the line pressure in accordance with shift positions of a manual lever so that when a manual spool of the manual valve is located at positions respectively corresponding to the drive position and the reverse position of the manual lever, the line pressure is output to destinations different from each other, respectively;

a control valve for introducing the line pressure output from the manual valve thereto so as to output a control hydraulic pressure by adjusting the line pressure;

a plurality of shift valves for shifting the oil flow passage between the control valve and a first engagement element or a second engagement element in accordance with the respective positions of shift valve spools;

a plurality of on-off solenoid valves for introducing the line pressure output from the manual valve thereto as well as for controlling the position of the respective shift valve spools of the shift valves by applying/releasing the line pressure in accordance with on/off of an electric current supply; and an electronic control unit having a plurality of on-off patterns accommodated therein, which define combination of the on/off of the electric current supply for each of the on-off solenoid valve, for controlling the on/off of the electric current supply of the on-off solenoid valves, wherein among a plurality of the on-off patterns of the electronic control unit, a on-off pattern during a first garage shifting when the manual spool is switched from the neutral position to a drive position by the operation of the manual lever is the same as that during a second garage shifting when being switched from the neutral position to the reverse position, and wherein the control valve controls the hydraulic pressure applied to the first engagement element during the first garage shifting while controlling the hydraulic pressure applied to the second engagement element during the second garage shifting.

2. The apparatus according to claim 1, wherein among a plurality of the on-off solenoid valves, a predetermined on-off solenoid valve is configured so that the line pressure is introduced thereto from the manual valve when the manual spool is located at a drive position while being not introduced thereto when the manual spool is located at the neutral position and the reverse position, and wherein a predetermined shift valve among a plurality of the shift valves is configured so that it is not controlled by the predetermined on-off solenoid valve when the line pressure is not introduced to the predetermined on-off solenoid valve while being controlled by the predetermined on-off solenoid valve when the line pressure is introduced to the predetermined on-off solenoid valve.

3. The apparatus according to claim 2, wherein in a plurality of the on-off patterns of the electronic control unit, the predetermined on-off solenoid valve during the first garage shifting and the second garage shifting has the on-off pattern in the non-energized state.

4. The apparatus according to claim 2, further comprising a fail valve for blocking off or switching the oil flow passage between the shift valves in accordance with the hydraulic pressure applied from the manual valve.

5. The apparatus according to claim 4, wherein during the first garage shifting, part of the line pressure output from the manual valve enters the fail valve.

6. The apparatus according to claim 1, wherein the apparatus includes three control valves, four shift valves, and five frictional engagement elements so as to achieve six forward ratios and one reverse ratio.

7. The apparatus according to claim 2, wherein the apparatus includes three control valves, four shift valves, and five frictional engagement elements so as to achieve six forward ratios and one reverse ratio.

8. The apparatus according to claim 3, wherein the apparatus includes three control valves, four shift valves, and five frictional engagement elements so as to achieve six forward ratios and one reverse ratio.

9. The apparatus according to claim 4, wherein the apparatus includes three control valves, four shift valves, and five frictional engagement elements so as to achieve six forward ratios and one reverse ratio.

10. The apparatus according to claim 5, wherein the apparatus includes three control valves, four shift valves, and five frictional engagement elements so as to achieve six forward ratios and one reverse ratio.

11. The apparatus according to claim 1, wherein the control valve includes part of the solenoid valve integrated thereto.

12. The apparatus according to claim 2, wherein the control valve includes part of the solenoid valve integrated thereto.

13. The apparatus according to claim 3, wherein the control valve includes part of the solenoid valve integrated thereto.

14. The apparatus according to claim 4, wherein the control valve includes part of the solenoid valve integrated thereto.

15. The apparatus according to claim 5, wherein the control valve includes part of the solenoid valve integrated thereto.

* * * * *